United States Patent [19]
Barrett et al.

[11] 3,883,839
[45] May 13, 1975

[54] POSITIONING DEVICE

[75] Inventors: William J. Barrett; Hal G. Meyer, both of Rockford, Ill.

[73] Assignee: Barber-Colman Company, Rockford, Ill.

[22] Filed: Oct. 29, 1973

[21] Appl. No.: 410,784

[52] U.S. Cl. .................. 338/116; 310/14; 335/228; 335/255
[51] Int. Cl. ...................... H01l 13/00; H02k 41/02
[58] Field of Search ..... 338/116; 336/136; 335/228, 335/255, 260, 279, 281; 310/14, 20, 23, 15

[56] References Cited
UNITED STATES PATENTS

| | | | |
|---|---|---|---|
| 359,101 | 3/1887 | Shallenberger | 338/116 |
| 589,073 | 8/1897 | Chapman | 338/116 |
| 809,796 | 1/1906 | Grabosch | 335/228 X |
| 1,226,697 | 5/1917 | Rinsche | 335/228 X |
| 1,941,210 | 12/1933 | Hurlburt et al. | 335/255 X |
| 2,726,342 | 12/1955 | Caretto | 310/30 |
| 2,802,428 | 8/1957 | Redyard | 338/98 X |
| 3,161,791 | 12/1964 | Geustenfeld | 310/23 |
| 3,381,250 | 4/1968 | Weathers | 335/255 |

*Primary Examiner*—Bruce A. Reynolds

[57] ABSTRACT

An electromagnetic positioning device comprises an armature or actuator movably mounted on a shaft and having a frusto-conical end conforming to a frusto-conical recess in a magnetic pole structure. A coil encompasses the pole structure to draw the armature toward the pole when the coil is energized. A rotatable output shaft is driven by a link connecting it to the actuator and a rotary potentiometer is likewise connected to be driven by the actuator so as to provide means for deriving an electrical signal representative of the angular position of the output shaft.

10 Claims, 4 Drawing Figures

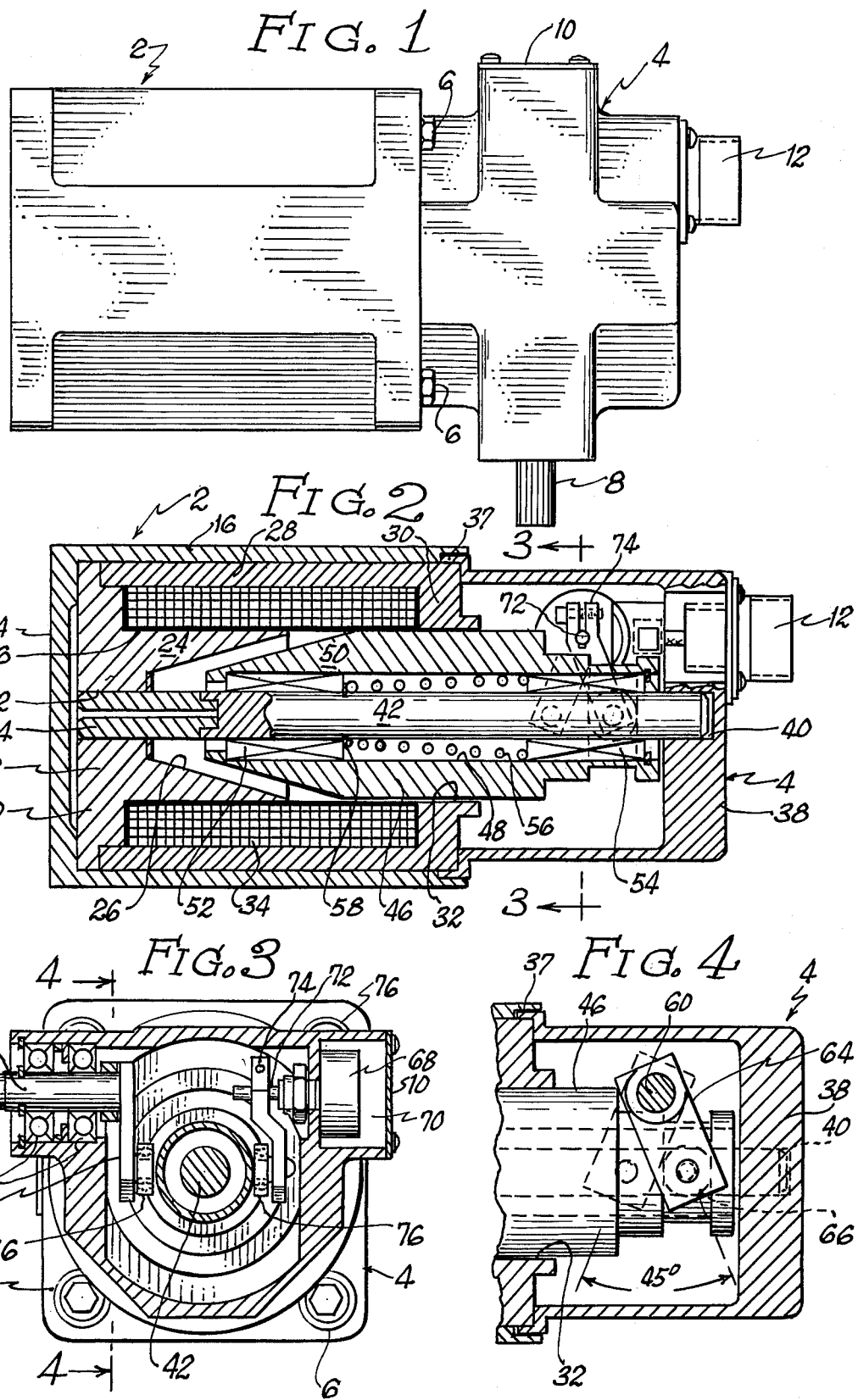

POSITIONING DEVICE

BACKGROUND OF THE INVENTION

This invention relates generally to positioning devices. More specifically, it relates to an electromagnetic positioning device capable of providing a relatively precise mechanical output. Electromagnets have been used for some time to function as linear or rotatable motors in order to drive or position output shafts to desired positions. Generally speaking, those with which the applicants are familiar do not have a capability to position shafts with the accuracy desired in many situations and under varying load conditions. For instance, it is frequently desirable to move valves in systems through which fluid is flowing to precise positions in order to control precisely the amount of fluid flowing in the system. The valve very frequently is moved to its desired position by a rotatable element, that is to say, a shaft which may be actuated by hand or by a motor either of the linear or rotary type. When the valve is of the motor driven type it is obvious that the matter should be capable of precise control so as to be able to move the valve as precisely as possible to its desired position.

It is an object of this invention to provide a novel electromagnetic positioning device capable of moving a control element such as a valve to a precise position.

It is a further object of this invention to provide an electromagnetic positioning device which is relatively efficient from the electrical point of view so that it does not require excessive power in its operation.

It is a still further object of this invention to provide a novel positioning device which is capable of being oriented in a number of different directions for mounting purposes, and which is also capable of permitting an output to be derived in a number of different directions when mounted.

It is a still further object of this invention to provide a novel positioning device which is capable of being utilized in environments wherein there are substantial amounts of deleterious materials such as dust, dirt, oil or grease, but its operation is not harmed thereby over substantially long periods of time.

BRIEF SUMMARY OF THE INVENTION

The foregoing and other objects are achieved in an embodiment of the invention wherein an actuator mounted on a shaft by means of bearings is movable toward and away from a magnetic stator encompassed by a coil and operates an output shaft as well as means effective to provide any electrical signal representative of the position of the output shaft.

BRIEF DESCRIPTION OF THE DRAWING

The invention itself is set forth in the claims appended hereto and forming a part of this specification while an understanding of structure and operation of an embodiment thereof may be derived from the detailed description taken in conjunction with the drawing in which:

FIG. 1 is a side view of an embodiment of the invention;

FIG. 2 is a sectional view of the embodiment of FIG. 1;

FIG. 3 is a view along the line 3—3 of FIG. 2; and

FIG. 4 is a view along the line 4—4 of FIG. 3.

DETAILED DESCRIPTION

In FIG. 1 there is shown an embodiment of the invention constituted by a housing 2 to which is attached a housing cover 4 by means of bolts or cap screws 6. A rotary output shaft extends outwardly from one side of the housing cover 4 while a cover 10 is attached by screws to the other side of the housing cover to provide access to the electrical signal control or generating device such as a potentiometer in a manner to be more described specifically hereinafter. Inasmuch as will be seen, various electrical elements are provided within the interior of the housing 2 and housing cover 4. An electrical connector 12 may be provided on the end of the housing cover whereby connections may be made to the electrical elements within. Alternatively electrical connections may be made through the housing wall in any fashion taking care to prevent the entry of extraneous materials such as dust.

Referring to FIG. 2, it may be seen that the housing 2 is constituted by a bottom 14 and sides 16. Mounted within the housing adjacent the bottom 14 is the base 18 of a stator formed of magnetizable material. The base 18 includes an end portion 20 provided with a central opening 22. Extending from the end portion 20 is a central cup portion 24 which, as may be seen, has a diameter less than that of the end portion. The interior surface 26 of the central cup portion is formed frusto-conical in shape so as to taper from its free end toward the end portion 20.

Extending from the end portion 20 and encompassed by the sides 16 of the housing 2 is a coil housing 28 also formed of magnetizable material. The end 30 of the coil housing opposite the end portion 20 is formed with an annular flange providing a central opening 32. Mounted in the space between the wall of the coil housing 28 and the central cup portion 24 is an actuating coil 34 wound on a suitable spool 36. The housing cover 4 is provided with flanges 37 engaging the wall 16 of the housing 2 so as to provide a good mechanical seal preventing the entry of dirt or other harmful materials to the interior and its closed end 38 opposite its open end confronting the open end of the housing 2 is provided with a central recess 40.

The actuator shaft 42 is mounted in the central opening 22 provided in the end portion 20 and in the recess 40 provided in the housing end cover 38 so that its longitudinal center line is coextensive with the centers of both of those openings and the center of the opening 32. The shaft may be formed as a unitary element or, if desired, the end 44 of the shaft 42 may be made of a nonmagnetic metal in order to prevent any loss of magnetic flux in the shaft.

Mounted on the actuator shaft is an actuator or armature 46 formed of magnetizable material and provided with a hollow interior 48. The front end 50 of the actuator is formed so as to be frusto-conical in shape tapering toward the actuator shaft 42 with its outer surface further shaped to conform to the interior surface 26 of the base 18. Mounted and secured in the frusto-conical end 50 is a rolling bearing means 52 which may be constituted by a so-called linear ball bushing, a commercially available device. Mounted and secured at the other end of the actuator is a similar rolling bearing means 54. The rolling bearings of the means 52 and 54 are in contact with the actuator shaft 42 and provide for a minimum of friction so as to greatly facilitate the movement of the actuator on the shaft. It is to be noted particularly that by tapering the actuator and the recess 26 as shown space is provided in the body of the actuator to provide bearings at each end. The structure, therefore, is one which is particularly stable because sidewise deflection is minimized.

The actuator is normally biased away from the end 18 by means of a coil spring 56, one end of which engages the bearing means 54 and the other end of which bears against a retaining means 58 which may take the form of a snap ring fixed to the shaft 42.

As would be clear from the preceding description, when the coil 34 is energized a magnetic circuit is created constituted by the base 18, the coil housing 28 and the actuator 46 so as to draw the actuator toward the base against the force of the coil spring 56. By virtue of the construction shown, including the provision of the actuator shaft 42 and the bearing means 52 and 54, the position of the actuator along the shaft may be precisely controlled as a function of the degree of energization of the coil 34, thus providing an accurate position controlling means, which in one embodiment has been constructed to permit positioning within 0.005 inch.

A complete positioning device in accordance with the invention is provided by an output shaft 60 rotatable in bearings 62 mounted in the housing cover 4. The shaft 60 is rotated upon movement of the actuator 46 by virtue of a connection provided by a drive link 64 connected at one end to the shaft 60 and at the other end to a connecting shaft 66 engaged by the actuator so that as the actuator moves linearly along the shaft 42 the output shaft is caused to rotate. FIG. 4 illustrates the available rotation of the output shaft in the embodiment illustrated.

In a closed loop control system it is necessary to provide a signal representative of the actual position of the element being controlled. By way of exemplification only, in the illustrated embodiment of the invention this signal is provided by a potentiometer 68 mounted within a space 70 closed by the cover 10. Alternatively a feedback signal may be derived by sensing some other physical parameter in a system under control. The shaft 72 of the potentiometer has connected thereto a potentiometer drive arm 74 which is connected at its other end to a short shaft 76 engaged by the actuator. Thus upon movement of the actuator the potentiometer shaft is rotated moving the wiper thereof, providing an electrical signal in any closed loop control circuit which may be used to control a positioning device in accordance with the invention.

A complete positioning device in accordance with the invention is one in which an accurate control of position at virtually the same current may be obtained, which further is electrically efficient and which may be constructed as a sturdy device capable of use in adverse environments. The angular position of the output with respect to the orientation of the device when mounted may be varied as desired and means is provided for producing a positionally responsive feedback signal.

Obviously various modifications may be made in the design of a device in accordance with the invention, and it is intended by the claims appended hereto and forming a part of this specification to cover all such modifications as are within their scope.

What we claim as new and desire to secure by letters patent is:

1. A positioning device comprising a base formed of magnetizable material having an end portion provided with an opening in the center thereof and a central cup portion extending from said end portion having an interior surface tapering from its free end toward said end portion, a coil housing of magnetizable material extending from said end portion and having a central opening at its end remote from said end portion, an annular actuating coil supported between said end portion and said end of said coil housing remote from said end portion, an actuator shaft mounted in said opening in said end with its longitudinal center line passing through the center line of said central cup interior and said central opening in said coil housing, a hollow actuator of magnetizable material encompassing said actuator shaft and tapered at one end whereby its outer surface at said one end conforms to the interior surface of said central cup, a first bushing mounted in said actuator at said tapered end and having rolling bearings engaging said actuator shaft, a second bushing mounted in said actuator at its other end and having rolling bearings engaging said actuator shaft, a spring exerting a force on said actuator to urge said actuator away from said end portion of said base whereby the actuator is variably positioned along the actuator shaft as a function of the energization state of said coil.

2. A positioning device as set forth in claim 1, including a rotatable output shaft and a link acting between said output shaft and said actuator adjacent its said other end whereby movement of said actuator on said actuator shaft upon a change in energization of said coil causes the output shaft to rotate.

3. A positioning device as set forth in claim 1, including means for deriving a signal representative of a variable controlled by said device.

4. A positioning device as set forth in claim 1, including a potentiometer having a rotatable input shaft, an arm acting between said input shaft and said actuator adjacent its said other end whereby movement of said actuator upon a change in energization of said coil causes said input shaft to rotate to vary the resistance of said potentiometer.

5. A positioning device as set forth in claim 1, including a housing open at one end encompassing said base and said coil housing with its closed end covering said base, a housing cover having an open end confronting said open end of said housing, a closed end, said closed end of said housing cover provided with a central recess and wherein one end of said actuator shaft is received in said recess.

6. A positioning device as set forth in claim 5, including a rotatable output shaft and a link acting between said output shaft and said actuator adjacent its said other end whereby movement of said actuator on said actuator shaft upon a change in energization of said coil causes the shaft to rotate.

7. A positioning device as set forth in claim 6, including a potentiometer having a rotatable input shaft, an arm acting between said input shaft and said actuator adjacent its said other end whereby movement of said actuator upon a change in energization of said coil causes said input shaft to rotate to vary the resistance of said potentiometer.

8. A positioning device as set forth in claim 7, whereby said output shaft is rotatably mounted in said housing cover on one side thereof and is spaced from the longitudinal center line of said actuator shaft and wherein said potentiometer is mounted in said housing cover on another side thereof and is spaced from the longitudinal center line of said actuator shaft.

9. A positioning device as set forth in claim 8, wherein said housing cover is releasably attached to said housing so as to permit it to be mounted in any one of a plurality of positions whereby said output shaft may extend transversely to the longitudinal axis of said actuator shaft in any of a plurality of directions.

10. A positioning device as set forth in claim 9, including an electrical connection housing whereby electrical connections may be made to the interior of the housing.

* * * * *